July 18, 1939.  G. T. SHOEMAKER  2,166,199
FURNACE CONSTRUCTION AND OPERATION
Filed Dec. 5, 1936  2 Sheets-Sheet 1

INVENTOR.
Guy T. Shoemaker
BY
ATTORNEY.

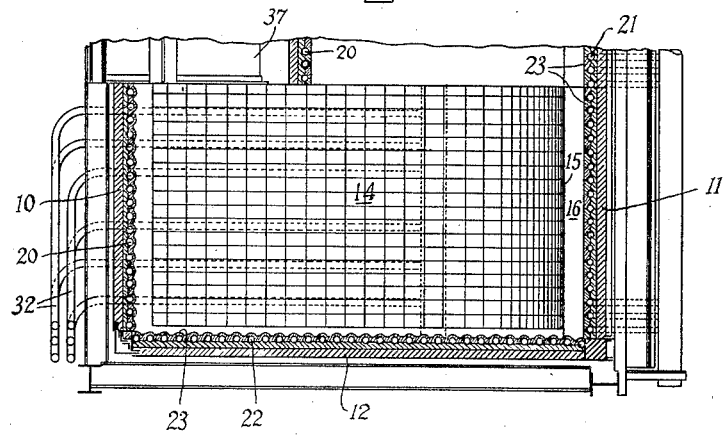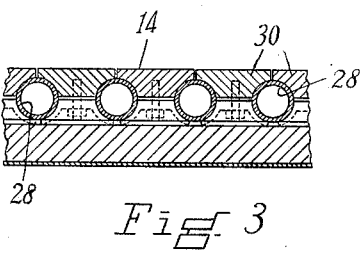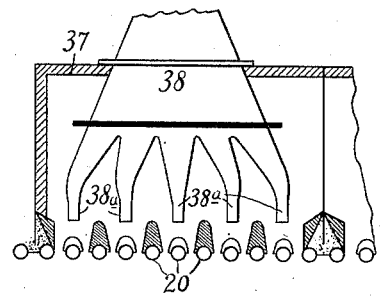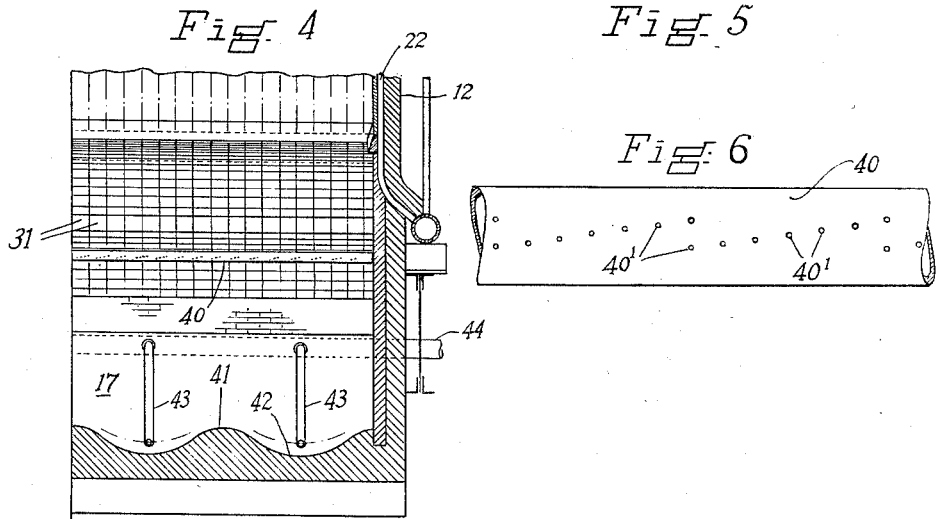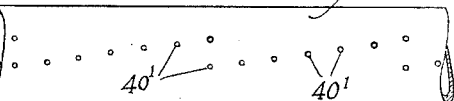

Patented July 18, 1939

2,166,199

UNITED STATES PATENT OFFICE 2,166,199

FURNACE CONSTRUCTION AND OPERATION

Guy T. Shoemaker, Kansas City, Mo., assignor to The Babcock & Wilcox Company, Newark, N. J., a corporation of New Jersey Application December 5, 1936, Serial No. 114,362

18 Claims. (Cl. 122—235)

This invention relates to the construction and operation of furnaces for burning finely divided solid fuel in suspension under furnace temperatures above the fusion temperature of the incombustible constituents of the fuel, and in which such incombustible constituents separate out of the burning fuel stream in the furnace and are separately removed.

The general object of my invention is the provision of an improved furnace construction for, and an improved method of, burning fuel of the character described in suspension under furnace temperatures above the fusion temperature of the incombustible constituents of the fuel. A further and more specific object is the provision of an improved furnace construction for, and an improved method of, treating and removing slag separating in the furnace chamber which produces solid slag of a character having a substantial commercial value.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 2 is a horizontal section taken partly on the line 2—2 and partly on the line 2ª—2ª of Fig. 1;

Fig. 3 is a vertical section through the furnace floor taken on the line 3—3 of Fig. 1;

Fig. 4 is a vertical section taken on the line 4—4 of Fig. 1;

Fig. 5 is a vertical section taken through the burner port shown in Fig. 1; and

Fig. 6 is an enlarged elevation of a portion of the slag spray pipe.

Figure 1:
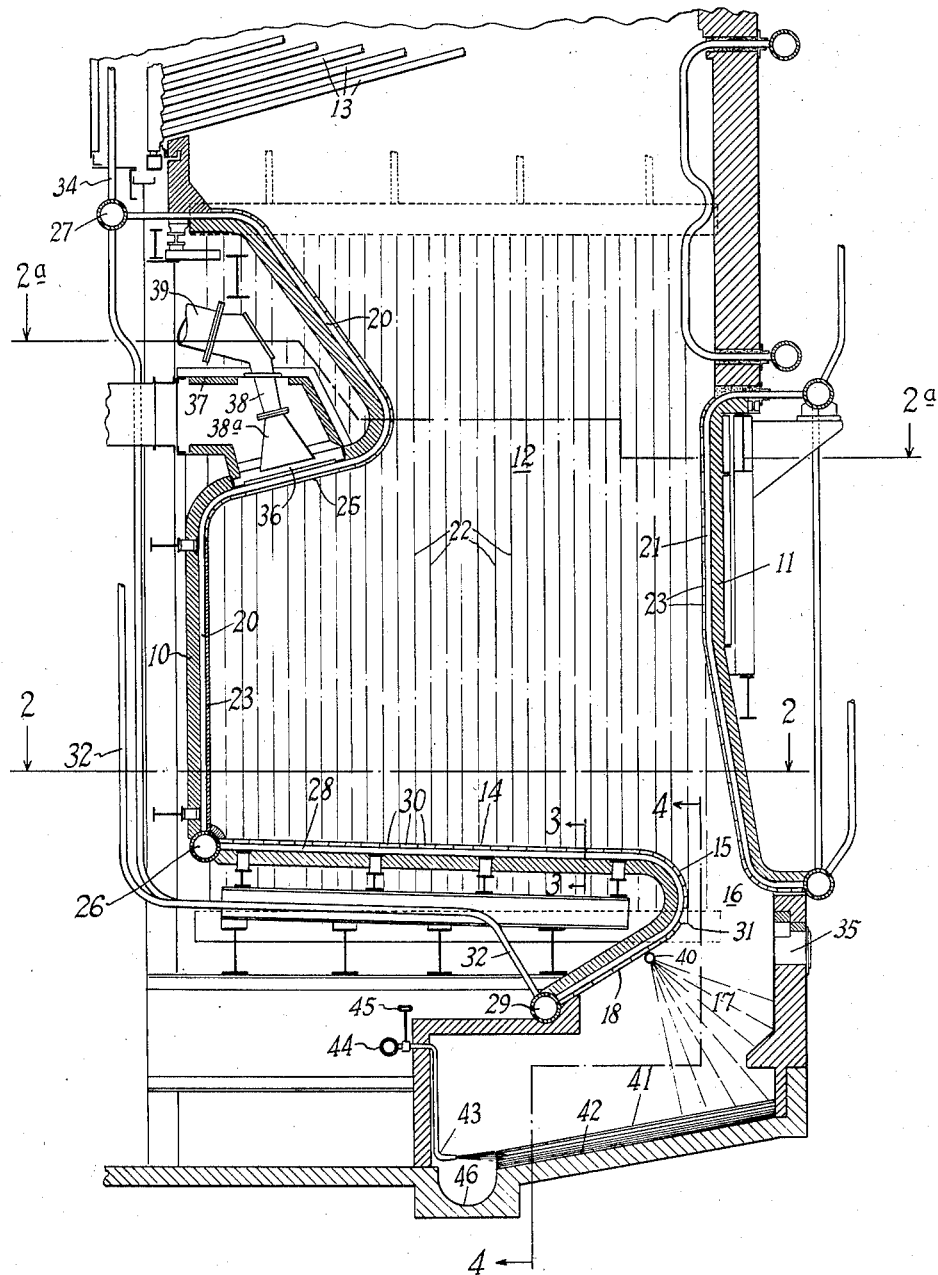
Fig. 1 is a sectional elevation of a furnace construction constructed in accordance with my invention.

The furnace illustrated comprises a vertically disposed front wall 10, an opposite rear wall 11, and a pair of opposite vertical side walls 12, relatively arranged to define a furnace chamber substantially rectangular in horizontal cross-section. The furnace illustrated is particularly designed to form a part of a water tube steam boiler having a rearwardly inclined bank of steam generating tubes 13 arranged above and receiving high temperature heating gases from the upper end of the furnace. The lower end or bottom of the furnace is closed over a major portion of its length by a floor 14 which is shown as sloping downwardly from the front wall 10 at a slight angle, such as between one and two degrees, towards the rear wall throughout its width. The rear or lower end of the floor 14 is formed with a rounded nose portion 15, a curvature of approximately 150° of circular arc being illustrated, and which cooperates with the lower portion of the rear wall 11 to define opposite sides of an unobstructed slag discharge aperture or slot 16 extending the full width of the furnace chamber. The distance between the nose portion 15 and the rear wall 11 is proportioned to minimize the amount of heat radiation through the aperture from the furnace chamber and yet retain sufficient width to avoid any possibility of slag accumulating on the nose or on the rear wall and bridging over the aperture. In one furnace installation of the character disclosed herein the aperture had a minimum width of approximately twenty-six inches. The lower end of the nose has a tangential continuation 18 forming an inclined roof portion for a chamber 17 which forms a slag pit subjacent to and communicating directly with the aperture 16.

All of the boundary surfaces of the furnace chamber are fluid cooled. The provisions for this purpose include vertically disposed water tubes 20 along the front wall, tubes 21 along the rear wall, and tubes 22 along each of the opposite side walls. The tubes 20, 21 and 22 are arranged in transversely spaced relation along the inner sides of the corresponding walls with the intertube spaces closed and the faces of the tubes covered as may be required to produce the desired furnace temperature. As shown, the tubes are covered and the intertube spaces closed by suitable heat resistant refractory material 23 either in the form of flat-faced metallic blocks clamped to the tubes, as shown on the rear wall, or initially plastic material held on the tubes by integral metallic tube projections, as shown for the lower part of the front and the side walls. The rear wall tubes 21 extend downwardly along the rear wall to a point opposite the curved portion of the nose 15, and the side wall tubes 22 terminate at approximately the same level so that the aperture 16 is defined on all sides by water cooled wall portions. The ends of the wall tubes 21 and 22 extend outwardly through the wall to corresponding pairs of external headers which are connected into the boiler circulation system so as to provide a rising flow of cooling fluid through these wall tubes.

The front wall and the corresponding cooling tubes 20 are shaped to form a rearwardly rising arch 25 extending across the width of the boiler, and then bent forwardly to the upper end of the furnace, defining a furnace outlet passage flaring upwardly from the rearmost portion of the arch 25. The lower ends of the front wall tubes 20 are connected to a transverse header 26 at the upper end of the floor 14, while the upper ends of the tubes 20 are connected to an external header 27 at the upper end of the furnace. A row of water tubes 28 slope rearwardly from the header 26 along the floor 14, and around the nose portion 15 to a transverse header 29. In accordance with my invention the tubes 28 are covered and the spaces between the tubes 28 closed by metallic blocks 30 clamped to the tubes. The blocks have flat upper surfaces collectively defining the smooth furnace floor 14, any openings between the blocks being closed by suitable means. The blocks 30 are extended completely around the nose portion 15 to the header 29. The thus formed cold roof of the slag pit 17 aids in keeping the slag pit cool. A row of special blocks 31 are clamped to the curved tube portions along the center line of the nose to form an exposed vertical surface arranged tangential to the adjacent curved surface of the nose for the purpose hereinafter described. Downcomer tubes 32 are connected to the header 29 to provide a supply of cooling water from the steam boiler drum, while the header 27 is connected to the drum by risers 34 to provide for the discharge of steam thereto and by recirculating tubes 33 to the lower header 29.

The furnace described is especially designed and adapted for use in burning pulverized coal in suspension at furnace temperatures above the ash fusion temperature of the coal. In accordance with my invention the refractory material 23 is omitted in a plurality of symmetrically arranged relatively widely spaced sections of the arch 25 to provide a corresponding number of rectangular burner ports 36 across which the inclined portions of the tubes 20 extend in transversely spaced relation. A combustion air casing 37 communicates with each port 36 and encloses a pulverized fuel burner 38 receiving a supply of pulverized coal and primary air from a conduit 39 and discharging the same through nozzles 38ª in a plurality of side-by-side streams through the intertube spaces of the arch intermingled with streams of secondary air from the enclosing casing 37. The fuel burning provisions are advantageously arranged so as to discharge the streams of pulverized coal and air in a generally downward and rearward direction normal to the inclination of the arch 25 and towards a section of the floor intermediate the length thereof. The arch is constructed and arranged and the supplies of coal and air controlled so that the entering coal will be ignited adjacent the arch and the burning coal stream will pass across a portion of the floor before turning upwardly towards the furnace outlet. A U-shaped combustion path is thus provided with a zone of relatively intense combustion above the middle and rear portions of the floor 14. A sub-atmospheric pressure is maintained in the furnace.

During the travel of the flame in the furnace and particularly on its change in direction, molten particles of slag separate and drop from the burning fuel stream onto the floor 14. In prior installations of slagging furnaces the entire furnace bottom has been constructed to receive and collect the molten slag particles in a pool on the bottom and from which molten slag is continuously or intermittently tapped through a slag tap opening in one of the vertical furnace walls. In many such furnaces the furnace conditions are such that the collected slag tends to solidify in the furnace at low loads, becoming molten and removable only when the furnace is operated at loads above a given value. Intermittent tapping imposes a tapping time which may be inconvenient, while with continuous tapping it has been considered necessary to keep the tap hole clear by auxiliary heating. Furnace designs have also been heretofore proposed in which molten slag is intended to run down one or more steeply inclined floor surfaces to a narrow aperture at the lower end thereof leading to a subjacent pit. In such designs it has been considered essential to maintain the slag in a molten condition until contacted by the cooling fluid. To insure maintenance of the liquid condition of the slag, refractory bottoms are employed and provisions are made for heating the aperture by either high temperature gases or an auxiliary fuel burner. The furnace designs shown in Hawley Patent No. 1,452,045 and Leitch et al. Patent No. 1,846,647 are examples of this type. Where the molten slag is discharged in a stream having a relatively high ratio of cross-sectional area to periphery, either periodically or continuously, and the slag quenched by contact with an impinging high pressure water jet or by falling into a pool of water, it has been found that most of the cooled slag will be in the form of small sharp-edged granular particles like coarse sand which are of no commercial value and difficult of disposal.

In accordance with my invention, the entire slag-contacted surface of the furnace bottom is water cooled as described, thus avoiding the serious problem of floor maintenance which would be present if a refractory floor were attempted to be used and also increasing the viscosity of the slag flowing over the floor. The floor is preferably so constructed and the fuel burners arranged that the separated slag will deposit over substantially the entire floor area, forming a layer or sheet of slag thereon. The layer of slag on the floor will be normally frozen on its lower face due to its contact with the cooled floor, thus providing a protective coating for the floor from any impact effects of the flame. The wall cooling surface of the furnace and rate of fuel firing are designed so as to normally maintain furnace temperatures above the ash fusion temperature of the fuel and sufficient to maintain at least the upper portion of the slag layer in a molten condition. The discharge edge of the floor is advantageously designed relative to the slag receiving portion of the floor to produce a slag discharge in a substantially uniform thin sheet over an extended floor length. The described sloping character of the floor and the direction of discharge of the fuel burners facilitates the continuous flow of slag towards the discharge aperture. The described arrangement of the floor also insures that any ash particles depositing thereon in a dry condition, such as may occur at light operating loads or with coals of different ash fusion temperatures, will be retained thereon, since the floor is in a plane at an angle substantially less than the angle of repose of such dry ash particles, until they become sufficiently fluid when the furnace is operated at higher loads to flow by gravity in a thin sheet down the floor to the discharge aperture.

In one steam boiler furnace of the character described efficiently burning a medium volatile high sulphur Kansas bituminous coal, having an ash content from 14.1 to 21 per cent with a fusion test of the ash showing an initial deformation of about 1990° F., a softening temperature of 2040° F., and a fluid temperature of 2310° F., the sheet of slag on the furnace floor was found to be approximately ½ inch thick along the middle and rear portions of the floor, building up adjacent the front wall to the extent of about 9 inches.

The slag is cooled to a slightly viscous condition as it flows down the water cooled floor and over the nose portion. As the slag sheet leaves the discharge edge of the floor which is defined by the special nose blocks 31, it tends to break up into a number of separate small streams and then into drops due to the surface tension of the slag and the absence of the adhesion effect of the floor. In operation it has been found that at times small accumulations of slag tend to build up at spaced points along the nose, possibly due to variations in the character of the fuel or rate of firing or small irregularities in the contour of the floor surface. Such accumulations can be easily removed by the furnace operator by inserting a bar through access openings 35 provided in the rear wall 11 adjacent the nose.

The slag dropping from the discharge edge 31 of the nose falls into the closed slag pit 17 where it is cooled to a solid state, resulting in the formation of relatively large pieces of irregular size and shape, somewhat resembling pieces of clinker or cinders from a mechanical stoker. This type of cooled slag is partly due to the condition and manner of slag discharge from the furnace chamber and partly to the particular slag cooling system provided. The slag pit 17 has a rearwardly rising bottom 41 divided into a plurality of transversely curved side-by-side troughs 42, as shown in Fig. 4. The slag cooling system comprises a pipe 40 connected to a supply of cooling water or other liquid of high heat absorptive capacity and arranged horizontally across the width of the slag pit roof slightly forwardly of the nose 15. As indicated in Figs. 1, 4, and 6, the cooling liquid is sprayed in a multiplicity of high velocity jets through small radial spray holes 40' arranged in stepped inclined rows along a lower sector of the pipe 40. The spray holes in each row discharge at different angles onto the rear wall and bottom of the slag pit. In practice the spray holes are spaced one inch apart, so that at least one spray steam will impinge on every six inches of floor space throughout the range of the spray. With this arrangement of the spray jets a substantial amount of cooling water is supplied to the pipe 40; for example, in the installation referred to approximately 300 gal. per minute at 8 lbs. pressure were passed through 270 one-eighth inch holes 40' in the spray pipe. This spray arrangement produces a wet surface over the entire area of the slag pit bottom receiving the slag dropping from the nose 15 and rapidly quenching the same as it deposits. The cooling effect of the slag pit roof and rear wall tubes, the relatively narrow discharge slot, the subatmospheric pressure in the furnace chamber, and the substantial amount of low temperature cooling water sprayed, all coact in maintaining a low temperature and relatively high humidity atmosphere in the slag pit. The doors for the openings 35 can also be opened as desired to lower the slag pit temperature. With a furnace temperature of 2280° F., the temperature at the discharge slot was found to be 1040° F. The slag pit temperature will necessarily be substantially lower than the slot temperature. The descending slag is partly cooled in transit through the slag pit, both by passing through the low temperature wet atmosphere and by contact with the spray jets, and finally by depositing on the wet bottom of the slag pit.

The cooled slag pieces accumulate in piles at the upper end of the slag pit troughs 42 along with any slag deposited on and dropping from the rear wall. The accumulated pieces of slag are periodically removed by operating a corresponding oscillatable nozzle 43 opposite the lower end of the trough to discharge a high pressure water stream into the base of the slag pile. The nozzles are supplied from a main 44 and their movements controlled by external levers 45. The slag pieces are washed down into a transverse sluice 46 and carried out of the furnace.

It will be observed that in accordance with my invention, the cooling of the slag is accomplished in three main steps; firstly, it is cooled and its viscosity increased by the heat transmitted by conduction to the floor and nose blocks and by radiation to the furnace wall cooling surface; secondly, as the viscous slag particles drop from the nose into the slag pit, their surface is further cooled by the wet cold atmosphere through which they pass and by contact with the spray jets; thirdly, the final cooling is accomplished with the slag particles at rest on the wet slag pit bottom by wetting the bottom and depositing slag with the multiplicity of spray jets. The fuel burners are also directed so that the zone of intense heat is forwardly of rather than directly above the discharge aperture and the aperture and slag pit are substantially cooled instead of being heated. The described progressive cooling of the slag while passing over the floor and nose and through the slag discharge aperture materially increases its viscosity and reduces its temperature when dropping through the aperture to a point within the range between the ash softening temperature and a temperature slightly above the ash fluid temperature. The described operations result in the production of relatively large pieces of solid slag which have a relatively substantial commercial value for filling, ballast, and other purposes. The furnace construction described is well adapted for use in the conversion of certain types of existing stoker fired furnaces into pulverized fuel burning furnaces.

While in accordance with the provisions of the statutes I have illustrated and described herein the best form of my invention now known to me, those skilled in the art will understand that changes may be made in the method and form of the apparatus disclosed without departing from the spirit of the invention covered by my claims, and that certain features of my invention may sometimes be used to advantage without a corresponding use of other features.

This application is a continuation in part of my prior application, Serial No. 76,824, filed April 28, 1936.

I claim:

1. A furnace having vertically disposed front, rear and opposite side walls defining a furnace chamber, a floor for said furnace chamber terminating in a rounded nose portion cooperating with the lower portion of said rear wall to define opposite sides of an elongated slag discharge aperture extending substantially between said side walls, a fuel burner arranged to direct pulverized slag-forming fuel and combustion air into said furnace chamber towards a section intermediate the length of said floor and causing the slag-forming fuel to burn in suspension at temperatures above the fuel ash fusion temperature while in a flame path tending to cause slag particles to deposit on said floor over an extended area, cooling tubes extending longitudinally of said floor and over said nose, a slag pit below and having uninterrupted communication with said aperture and having a floor arranged to receive slag dropping from said nose portion, and means for maintaining at least the slag-receiving portion of said slag pit floor wet with a cooling liquid of high heat absorption capacity.

2. A furnace having vertically disposed front, rear and opposite side walls defining a furnace chamber, a floor for said furnace chamber sloping rearwardly at a slight angle and terminating in a rounded nose portion cooperating with the lower portion of said rear wall to define opposite sides of an elongated slag discharge aperture extending substantially between said side walls, a fuel burner arranged to direct pulverized slag-forming fuel and combustion air into said furnace chamber towards a section intermediate the length of said floor and causing the slag-forming fuel to burn in suspension at temperatures above the fuel ash fusion temperature while in a flame path tending to cause slag particles to deposit on said floor over an extended area and to flow slowly down said floor to said aperture, cooling tubes extending longitudinally of said floor and over said nose, a slag pit below and having uninterrupted communication with said aperture and having a floor arranged to receive slag dropping from said nose portion, and spray means in said slag pit arranged to downwardly discharge jets of cooling liquid onto the portion of said slag pit floor receiving the descending slag.

3. A furnace having vertically disposed front, rear and opposite side walls defining a furnace chamber, a floor for said furnace chamber sloping rearwardly at a slight angle and terminating in a rounded nose portion cooperating with the lower portion of said rear wall to define opposite sides of an elongated slag discharge aperture extending substantially between said side walls, a fuel burner arranged to direct pulverized slag-forming fuel and combustion air into said furnace chamber towards a section intermediate the length of said floor and causing the slag-forming fuel to burn in suspension at temperatures above the fuel ash fusion temperature while in a flame path tending to cause slag particles to deposit on said floor over an extended area and to flow slowly down said floor to said aperture, cooling tubes extending longitudinally of said floor and over said nose, a slag pit below and having uninterrupted communication with said aperture and having a floor arranged to receive slag dropping from said nose portion, spray means in said slag pit adjacent said nose portion arranged to downwardly discharge jets of cooling liquid onto the portion of said slag pit floor receiving the descending slag, and means for hydraulically removing the quenched slag from said slag pit.

4. A furnace having vertically disposed front, rear and opposite side walls defining a furnace chamber, a floor for said furnace chamber terminating in a rounded nose portion cooperating with the lower portion of said rear wall to define opposite sides of an elongated slag discharge aperture extending substantially between said side walls, an inclined arch extending upwardly and rearwardly from the upper portion of said front wall, a fuel burner arranged to direct pulverized slag-forming fuel and combustion air rearwardly and downwardly from said arch into said furnace chamber towards a section intermediate the length of said floor and causing the slag-forming fuel to burn in suspension at temperatures above the fuel ash fusion temperature while in a flame path tending to cause slag particles to deposit on said floor over an extended area, cooling tubes extending longitudinally of said floor and over said nose, vertically disposed cooling tubes along said front, rear and side walls, the cooling tubes for said rear wall extending downwardly below said floor nose portion, a slag pit below and having uninterrupted communication with said aperture and having a floor arranged to receive slag dropping from said nose portion, and spray means in said slag pit arranged to downwardly discharge jets of a cooling liquid onto the portion of said slag pit floor receiving the descending slag.

5. A furnace having vertically disposed front, rear and opposite side walls defining a furnace chamber, a floor for said furnace chamber sloping rearwardly at a slight angle and terminating in a rounded nose portion cooperating with the lower portion of said rear wall to define opposite sides of an elongated slag discharge aperture extending substantially between said side walls, an inclined arch extending upwardly and rearwardly from the upper portion of said front wall, a fuel burner arranged to direct pulverized slag-forming fuel and combustion air rearwardly and downwardly from said arch into said furnace chamber towards a section intermediate the length of said floor and causing the slag-forming fuel to burn in suspension at temperatures above the fuel ash fusion temperature while in a flame path tending to cause slag particles to deposit on said floor over an extended area and to flow slowly down said floor to said aperture, cooling tubes extending longitudinally of said floor and over said nose, vertically disposed cooling tubes along said front, rear and side walls, the cooling tubes for said rear wall extending downwardly below said floor nose portion, a slag pit below and having uninterrupted communication with said aperture and having a floor arranged to receive slag dropping from said nose portion, spray means in said slag pit adjacent said nose portion arranged to downwardly discharge high velocity jets of cooling liquid onto the portion of said slag pit floor receiving the descending slag, and means for hydraulically removing the quenched slag from said slag pit.

6. The method of burning a finely divided slag-forming fuel in suspension at furnace temperatures above the fusion temperature of the slag-forming constituents of the fuel which comprises introducing a stream of pulverized slag-forming fuel and combustion air into a furnace chamber and burning the fuel in suspension above a substantially horizontal slag-collecting surface at furnace temperatures above the fusion temperature of the slag-forming constituents of the fuel and whereby slag particles separating from the burning fuel stream are distributed over an extended area of the slag-collecting surface and flow over the slag-collecting surface in a relatively thin wide stream to a transversely elongated discharge aperture, cooling the slag while on said slag-collecting surface and while passing through said discharge aperture to a viscous condition, and quenching the slag in relatively large solidified fragments in a low temperature cooling chamber by direct contact with a cooling liquid of high heat absorption capacity.

7. A furnace having vertically disposed front, rear and opposite side walls defining a furnace chamber, a substantially horizontal floor for said furnace chamber terminating at its rear end in a rounded nose portion cooperating with the lower portion of said rear wall to define opposite sides of an elongated slag discharge aperture extending across the furnace, a fuel burner arranged to direct pulverized slag-forming fuel and combustion air into said furnace chamber towards a section intermediate the length of said floor and causing the slag-forming fuel to burn in suspension at temperatures above the fuel ash fusion temperature while in a flame path tending to cause slag particles to deposit on said floor over an extended area, cooling tubes extending longitudinally of said floor and over said nose, a slag pit below said aperture and arranged to receive slag dropping from said nose portion, and means for cooling said slag in said slag pit with a cooling liquid of high heat absorption capacity.

8. A furnace having walls defining a furnace chamber, a continuous floor extending in a substantially horizontal plane over a major portion of the bottom of said furnace chamber and constructed to receive and support a layer of separated slag thereon, said floor terminating at one end at a slag discharge aperture elongated transversely of said floor, means for burning finely divided solid fuel in suspension above said floor at a heat release rate proportioned relative to the furnace chamber volume and heat absorption area to effect a furnace temperature causing ash separating from the burning fuel to collect on said floor in a molten condition, means for fluid cooling said floor, a slag pit below said aperture and having a floor arranged to receive slag dropping into said slag pit, and means for maintaining at least the slag-receiving portion of said slag pit floor wet with a cooling liquid.

9. A furnace having walls defining a furnace chamber, a continuous floor extending in a substantially horizontal plane over a major portion of the bottom of said furnace chamber and constructed to receive and support a layer of separated slag thereon, said floor terminating at one end in a rounded nose portion defining one side of a slag discharge aperture elongated transversely of said floor, means for burning finely divided solid fuel in suspension above said floor at a heat release rate proportioned relative to the furnace chamber volume and heat absorption area to effect a furnace temperature causing ash separating from the burning fuel to collect on said floor in a molten condition, means for fluid cooling said floor and nose, a slag pit below said aperture and having a floor arranged to receive slag flowing over said nose, and means for maintaining at least the slag-receiving portion of said slag pit floor wet with a cooling liquid.

10. A furnace having vertically disposed walls defining the sides of a furnace chamber, a continuous floor extending over a major portion of the bottom of said furnace chamber in a plane sloping at a slight angle to the horizontal and constructed to receive and support a layer of separated slag thereon, said floor terminating at its lower end in a nose portion defining one side of a slag discharge aperture elongated transversely of said floor, means for burning finely divided solid fuel in suspension above said floor at a heat release rate proportioned relative to the furnace volume and heat absorption area to effect a furnace temperature causing ash separating from the burning fuel to collect on said floor in a molten condition, means for fluid cooling said floor and nose, a slag pit below said aperture and having a floor arranged to receive slag flowing over said nose, and means for maintaining at least the slag-receiving portion of said slag pit floor wet with a cooling liquid.

11. A furnace having vertically disposed walls defining the sides of a furnace chamber, a continuous floor extending over a major portion of the bottom of said furnace chamber in a plane sloping at a slight angle to the horizontal and constructed to receive and support a layer of separated slag thereon, said floor terminating at its lower end in a nose portion cooperating with the lower portion of one of said side walls to define opposite sides of a slag discharge aperture elongated transversely of said floor, means for burning finely divided solid fuel in suspension above said floor at a heat release rate proportioned relative to the furnace volume and heat absorption area to effect a furnace temperature causing ash separating from the burning fuel to collect on said floor over an extended area in a molten condition, means for fluid cooling said floor and nose, a slag pit below said aperture and having a floor arranged to receive slag flowing over said nose, and means for maintaining at least the slag-receiving portion of said slag pit floor wet with a cooling liquid.

12. A furnace having vertically disposed walls defining the sides of a furnace chamber, a continuous floor extending over a major portion of the bottom of said furnace chamber in a plane sloping at a slight angle to the horizontal and constructed to receive and support a layer of separated slag thereon, said floor terminating at its lower end in a nose portion cooperating with the lower portion of one of said side walls to define opposite sides of a slag discharge aperture elongated transversely of said floor, means for burning finely divided solid fuel in suspension above said floor at a heat release rate proportioned relative to the furnace volume and heat absorption area to effect a furnace temperature causing ash separating from the burning fuel to collect on said floor over an extended area in a molten condition, means for fluid cooling said floor and nose, a slag pit below and having an uninterrupted communication with said aperture and having a floor arranged to receive slag flowing over said nose and dropping into said slag pit, and means for spraying at least the slag-receiving portion of said slag pit floor with a cooling liquid of high heat absorption capacity.

13. In a furnace chamber having a fluid cooled floor arranged in a substantially horizontal plane and having a discharge edge extending transversely of the floor and along one side of a transversely elongated slag discharge aperture, the method of burning a finely divided solid fuel in suspension and recovering incombustible constituents of the fuel from the furnace chamber in the form of relatively large solidified slag pieces which comprises burning the fuel in suspension above the floor at a heat release rate sufficient to cause particles of incombustible material separating from the burning fuel and depositing on the floor to flow as a fluid slag by gravity alone in a relatively thin stream over the floor towards the slag discharge aperture, cooling the slag stream during its passage over the floor to cause it to be in a highly viscous condition when dropping through the slag discharge aperture, and quenching the highly viscous slag dropping through the slag discharge aperture in a subjacent low temperature slag cooling chamber by direct contact with a cooling liquid of high heat absorption capacity.

14. In a furnace chamber having a fluid cooled floor arranged in a substantially horizontal plane and having a discharge edge extending transversely of the floor and along one side of a transversely elongated slag discharge aperture, the method of burning a finely divided solid fuel in suspension and recovering incombustible constituents of the fuel from the furnace chamber in the form of relatively large solidified slag pieces which comprises burning the fuel in suspension above the floor at a heat release rate sufficient to cause particles of incombustible material separating from the burning fuel and depositing on the floor to flow as a fluid slag by gravity alone in a relatively thin stream over the floor towards the slag discharge aperture, fluid cooling the floor sufficiently to cause slag flowing over the floor to be in a viscous condition on reaching the discharge edge, fluid cooling the slag discharge aperture to a temperature substantially below the slag fusion temperature, and quenching the viscous slag dropping through the slag discharge aperture in a subjacent low temperature slag cooling chamber by direct contact with a cooling liquid of high heat absorption capacity.

15. In a furnace chamber having a fluid cooled floor arranged in a substantially horizontal plane and having a discharge edge extending transversely of the floor and along one side of a transversely elongated slag discharge aperture, the method of burning a finely divided solid fuel in suspension over a wide range of furnace temperatures and recovering incombustible constituents of the fuel from the furnace chamber in the form of relatively large solidified slag pieces which comprises burning the fuel in suspension above the floor at a heat release rate causing particles of incombustible material separating from the burning fuel and depositing on the floor in a non-fluid condition to be retained thereon, increasing the furnace temperature sufficiently to put the deposited incombustible material in condition to flow as a fluid slag by gravity alone in a relatively thin stream over the floor towards the slag discharge aperture, fluid cooling the floor and slag discharge aperture sufficiently to cause slag flowing over the floor to be in a highly viscous condition when dropping through the slag discharge aperture, and quenching the highly viscous slag dropping through the slag discharge aperture in a subjacent low temperature slag cooling chamber by direct contact with a cooling liquid of high heat absorption capacity.

16. In a furnace chamber having a fluid cooled floor arranged in a substantially horizontal plane and having a discharge edge extending transversely of the floor and along one side of a transversely elongated slag discharge aperture, the method of burning a finely divided solid fuel in suspension and recovering in combustible constituents of the fuel from the furnace chamber in the form of relatively large solidified slag pieces which comprises burning the fuel in suspension above the floor at a heat release rate sufficient to cause particles of incombustible material separating from the burning fuel and depositing on the floor to flow as a fluid slag by gravity alone in a relatively thin stream over the floor towards the slag discharge aperture, cooling the slag stream during its passage over the floor to cause it to be in a viscous condition on reaching the discharge edge, cooling the viscous slag while dropping from the discharge edge in separate small streams through the slag discharge aperture into a subjacent low temperature slag cooling chamber, and quenching the highly viscous slag streams while in the slag cooling chamber by direct contact with a cooling liquid of high heat absorption capacity.

17. A furnace having walls defining a furnace chamber, a continuous floor extending in a substantially horizontal plane over the bottom of said furnace chamber and constructed to receive and support a layer of separated slag thereon, said floor terminating at one end in a rounded nose portion defining the side of a transversely elongated slag discharge aperture extending substantially the full width of the furnace chamber, means for burning finely divided fuel in suspension above said floor at a heat release rate sufficient to cause particles of incombustible material separating from the burning fuel and depositing on the floor to flow as a fluid slag over said floor towards said slag discharge aperture, a slag cooling chamber below said slag discharge aperture and arranged to receive slag dropping from said nose portion, means for progressively cooling the deposited slag during its passage to said slag cooling chamber including means for fluid cooling said floor, nose portion and slag discharge aperture, and means for quenching the slag dropping into said slag cooling chamber by direct contact with a cooling liquid of high heat absorption capacity.

18. A furnace having walls defining a furnace chamber, a continuous floor extending in a substantially horizontal plane over the bottom of said furnace chamber and constructed to receive and support a layer of separated slag thereon, said floor terminating at one end in a rounded nose portion defining one side of a transversely elongated slag discharge aperture extending substantially the full width of the furnace chamber, means for burning finely divided fuel in suspension above said floor at a heat release rate sufficient to cause particles of incombustible material separating from the burning fuel and depositing on the floor to flow as a fluid slag over said floor towards said slag discharge aperture, a slag cooling chamber below said slag discharge aperture and arranged to receive slag dropping from said nose portion, means for progressively cooling the deposited slag during its passage to said slag cooling chamber including a row of water tubes extending longitudinally along said floor, downwardly around said nose portion and along one side of said slag cooling chamber, another row of water tubes extending downwardly along and cooling the opposite side of said slag discharge aperture, and means for quenching the slag dropping into said slag cooling chamber by direct contact with a cooling liquid of high heat absorption capacity.

GUY T. SHOEMAKER.